United States Patent
Owens

[15] 3,679,812
[45] July 25, 1972

[54] ELECTRICAL SUSPENSION CABLE FOR WELL TOOLS

[72] Inventor: Nevyl G. Owens, Houston, Tex.

[73] Assignee: Schlumberger Technology Corporation, New York, N.Y.

[22] Filed: Nov. 13, 1970

[21] Appl. No.: 89,325

[52] U.S. Cl..............................174/108, 174/29, 174/102 P, 174/103 R, 174/110 S
[51] Int. Cl........................................................H01b 7/22
[58] Field of Search...............174/108, 109, 102, 102 P, 103, 174/113, 115, 29, 70, 70 C, 70 A

[56] References Cited

UNITED STATES PATENTS

| | | | |
|---|---|---|---|
| 2,061,862 | 11/1936 | Wells | 174/108 X |
| 1,852,902 | 4/1932 | Rockwell | 174/115 X |

FOREIGN PATENTS OR APPLICATIONS

| | | | |
|---|---|---|---|
| 601,630 | 5/1948 | Great Britain | 174/102 P |
| 685,439 | 1/1953 | Great Britain | 174/108 |

Primary Examiner—Lewis H. Myers
Assistant Examiner—A. T. Grimley
Attorney—Ernest R. Archambeau, Jr., Stewart F. Moore, David L. Moseley, Edward M. Roney and William R. Sherman

[57] ABSTRACT

Representative embodiments are disclosed herein of new and improved armored electrical cables for supporting well tools in extra-deep well bores in which extreme geothermal temperatures may be encountered. To support the cable armor, the electrical conductors in these cables are enclosed within a tubular jacket which is formed of a helically wound metal strip having a rectangular cross section. In one embodiment of the invention, the individual electrical conductors are encased within thin-wall metal tubes and filled with a compacted powdered thermal and electrical insulating material for providing a suitable insulation capable of withstanding the most extreme temperatures which may be encountered. In another embodiment of the invention, the electrical conductors are sheathed in a special temperature-resistant plastic material to provide a cable for service at less extreme temperatures.

3 Claims, 3 Drawing Figures

PATENTED JUL 25 1972 3,679,812
FIG.1
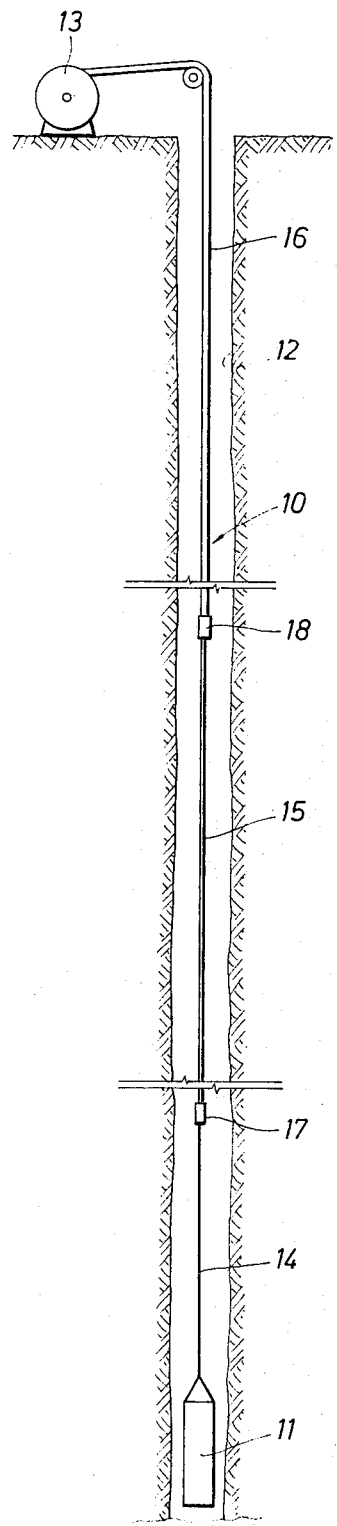
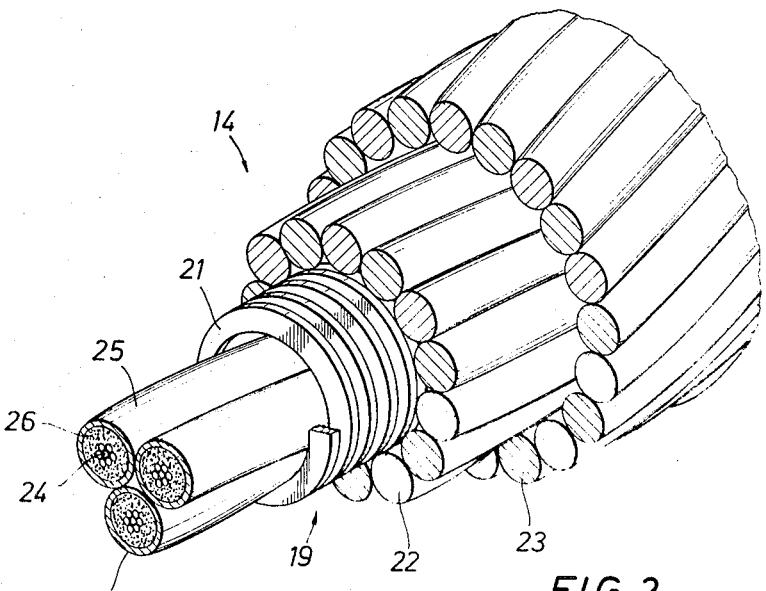
FIG.2
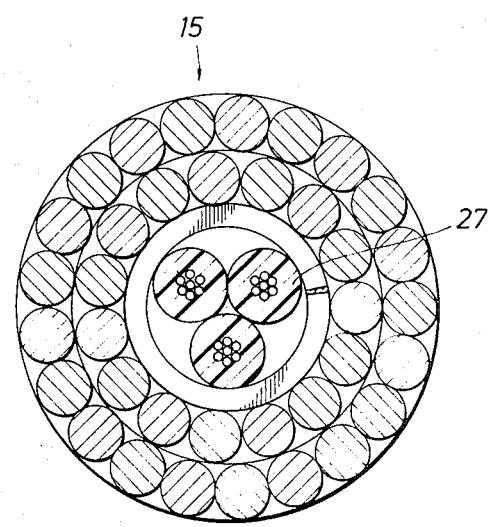
FIG.3
Nevyl G. Owens
INVENTOR
BY *E.R. Archambeau Jr.*
ATTORNEY

ELECTRICAL SUSPENSION CABLE FOR WELL TOOLS

It is not at all uncommon today to find well bores which are being drilled to depths of about 25,000 feet. Prospective wells being planned for the immediate future are expected to reach at least 28,000 feet. It is anticipated, therefore, that the bottomhole or geothermal temperatures of such wells will be at least 400°F and may possibly be as high as 525°F. Those skilled in the art will recognize, however, that temperatures of this magnitude are substantially the maximum which the most-advanced well logging cables of today are capable of reliably withstanding. Thus, although it is anticipated that in the next decade wells may be drilled to depths approaching 50,000 feet, present-day logging cables are simply incapable of withstanding the extreme goethermal temperatures which may be reasonably expected to be encountered at such depths.

Accordingly, it is an object of the present invention to provide new and improved electrical well tool cables for service in well bores drilled to depths in excess of about 30,000 feet.

This and other objects of the present invention are attained by providing a well-tool cable having one or more electrical conductors enclosed within a tubular jacket formed of a helical metal strip which is closely wound about the grouped conductors for supporting multiple layers of armor strands which are wound in a typical fashion around the exterior of the jacket. In one embodiment of the invention, each of the conductors is encased in a thin-wall metal tube having its interior bore filled with a compacted powdered material having electrical and thermal insulating properties. In anOther embodiment of the invention, the electrical conductors are respectively covered by a sheath of a temperature-resistant plastic material.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 shows a typical well-logging tool suspended in a well bore by a suspension cable arranged in accordance with the principles of the present invention;

FIG. 2 is an isometric view of one portion of the new and improved suspension cable depicted in FIG. 1; and FIG. 3 is a cross-sectional view of another portion of the new and improved cable shown in FIG. 1.

Turning now to FIG. 1, a new and improved well tool suspension cable 10 arranged according to the principles of the present invention is depicted as it may appear while supporting a typical well logging tool 11 in a borehole 12 of extreme depths. As is customary, the cable 10 is spooled on a powered winch 13 suitably arranged for moving the tool 11 through the borehole 12.

Those skilled in the art will, of course, appreciate that the geothermal temperatures encountered by the cable 10 and tool 11 will progressively increase in proportion to the depth of the borehole 12. Thus, in the interest of economy, the cable 10 is preferably divided into three sections 14–16 which are tandemly coupled together with suitable connectors 17 and 18. To minimize the weight of the cable 10, its three sections 14–16 are preferably made with progressively-larger diameters.

Since the most extreme geothermal temperatures will most likely be encountered only in the lowermost portions of the borehole 12, the lower section 14 of the new and improved cable 10 is cooperatively arranged as will be subsequently explained for operation at temperatures above about 800°F and at least as high as 1100°F. For similar reasons, since the intermediate section 15 of the cable 10 would usually be exposed to only less extreme borehole temperatures, this section is cooperatively arranged as will be later described for service at temperatures between about 500°F and about 800°F. The uppermost section 16 of the cable 10 is preferably comprised of a typical logging cable such as those shown in U.S. Pat. No. 2,604,509 or U.S. Pat. No. 3,259,675 which are well suited for operation at more moderate borehole temperatures.

It will, of course, be recognized that the temperatures in a borehole will not always be known with precision prior to a well-completion operation. Thus, as a practical expedient, the cable 10 is preferably arranged so that the length of the lowermost cable section 14 will be sufficient to maintain its upper end well above those depths in the borehole 12 where the ambient temperatures are expected to be as high as about 800°F. The length of the intermediate cable section 15 is also chosen in a similar fashion. On the other hand, should some unusual situation be anticipated, the intermediate cable section 15 could be replaced with a section similar to the lower cable section 14.

Turning now to FIG. 2, an isometric view is shown of a preferred embodiment of the lowermost section 14 of the electrical logging cable 10 of the present invention to illustrate its unique construction. As seen there, the cable section 14 has a central axial core 19 comprised of a plurality of electrical conductors 20 that are symmetrically grouped and enclosed within a uniquely arranged core jacket 21 which is operatively arranged for serving as a retainer and base for twO or more layers of armor as at 22 and 23.

As depicted, each Of the electrical conductors 20 are comprised of a plurality of wires 24 preferably of copper and coated with nickel to protect the wires from corrosion. To protect the wires 24 from the severest environmental conditions which may be encountered, each of the conductors 20 is further comprised of thin-walled metallic tube 25 which is coaxially disposed around the several wires. In a typical embodiment of the cable section 14, each of the tubes 25 is a nickel alloy seamless tube having an outer diameter of 0.096 inches and a wall thickness of 0.015 inches. To electrically insulate the wires 24 as well as to provide a suitable thermal barrier between the wires and the tubes 25, each of the tubes is compactly packed with a suitable powdered or granular substance 26 having a low thermal conductivity as well as a high electrical resistance. Although other materials such as aluminum oxide and various ceramics are acceptable, it is preferred that the powder 26 be magnesium oxide in view of its ability to withstand temperatures in the order of 3,400°F. In a typical manner of manufacturing the conductors 20, the wires 24 are disposed in their resPective tube 25 which has been previously coated internally with the powdered substance 26. Then by drawing the tubes 25 through one or more progressively smaller dies, the tubes 25 are reduced to their final diameter with the powder 26 being tightly compacted around wires 24. As depicted in FIG. 2, the several conductors 20 are symmetrically grouped into a compact arrangement and the grouped conductors are spiraled to compensate for thermal expansion as well as cable stretch.

Of particular significance to the present invention, it will be noted from FIG. 2, that the core jacket 21 is a helically wound coil of a flat, rectangularly cross-sectioned steel wire which is tightly wound about the grouped conductors 20 to provide maximum strength for withstanding inwardly directed radial loads. The strip or flat-wire forming the core jacket 21 is wound so that the minor dimension or thickness of the strip will be perpendicular to the longitudinal axis of the cable section 14 and the major dimension or width of the strip will be parallel to the longitudinal axis of the cable. In the preferred embodiment illustrated, the flat strip is 0.020 inch thick and has a width of 0.093 inch to 0.125 inch.

As the cable section 14 is manufactured, the core jacket 21 is wound tightly around the grouped, spiraled conductors 20 so that the metal tubes 25 are slightly compressed. In this manner, the conductors 20 are frictionally engaged within the core jacket 21 for supporting the weight of the several conductOrs. In the preferred embodiment of the cable section 14, this is accomplished by winding the coiled strip forming the jacket 21 so that its internal diameter is about 0.020 inch less than the initial outside diameter of the grouped conductors 20.

The internal and external layers of armor 22 and 23 of the cable section 14 are helically wound around the core jacket 21 in a typical manner. That is to say, the inner armor layer 22 is comprised of a plurality of metallic strands which are wound in one so-called "lay" direction about the core jacket 21; and the outer armor layer 23 is comprised of a plurality of metal strands of the same or greater diameter which are wound in an oppositely directed lay about the innermost armor layer. The number, size and pitch or lay angle of the armor wires are chosen so that the inner layer 22 substantially covers the core jacket 21 and the outer layer 23 substantially covers the inner layer. As is customary, the design of these inner and outer armor layers 22 and 23 is optimized to perform the usual tension-bearing functions of the cable section 14. In the illustrated embodiment of the cable section 14, the inner and outer armor layers 22 and 23 are formed of a suitable corrosion-resistant high-strength alloy of a diameter of 0.053 inches which is particularly suited to maintain its strength at elevated temperatures in the order of 1,100°F. The preferred metal used here is a nickel-cobalt base alloy presently marketed by Latrobe Steel Co. of Latrobe, Pennsylvania, under the trade name of MP35N Multiphase Alloy. As shown in the extant literature, this material has a nominal composition of 35 percent nickel, 35 percent cobalt, 20 percent chromium and 10 percent molybdenum.

Turning now to FIG. 3, a cross-sectional view is shown of the cable section 15 which is also arranged in accordance with the principles of the present invention. It will be noted by comparison of FIGS. 2 and 3 that the cable section 15 is substantially similar to the cable section 14, with the only significant difference between the cable sections being that the latter cable would not be expected to withstand temperatures as high as those expected of the former cable. Thus, in the preferred embodiment of the cable section 15, the electrical conductors are enclosed only in a suitable elastomeric material 27 having selected high-temperature ratings such as a thermal-resistant poly-m-carboranesiloxane polymer. This material (such is presently designated DEXSIL by Olin-Mathieson Chemical Corp. Of New Haven, Conn.) has been found to be capable of providing satisfactory physical and electrical characteristics when exposed to temperatures in the order of 900°F.

Accordingly, it will be appreciated that the present invention has provided new and improved cables which are capable of withstanding the severe environmental conditions which may be encountered in ultra-deep well bores having depths greatly in excess of 25,000 feet to 30,000 feet. By jacketing the one or more electrical conductors incorporated in such cables within a closely wound strip or wire of a rectangular cross-section, crushing of the electrical conductors as the cable is being spooled onto a winch drum will be avoided. Moreover, in the high-temperature cable disclosed initially herein, the electrical conductors are protected againSt high temperatures, high pressures and gas inclusion by encasing each of the several wires within a small-diameter metal tube having its interior spaces filled with a compacted powdered material having acceptable thermal and electrical properties. Where less extreme temperatures are expected, a suitable plastic such as the disclosed carboranesiloxane polymer may be employed instead of the metal tubes.

While only particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A suspension cable adapted for supporting a well tool in well bores in which extreme temperatures may be encountered and comprising: at least one electrical conductor; insulating means including a tubular sheath of a poly-m-carboranesiloxane polymer elastomeric material enclosing said electrical conductor and cooperatively arranged for electrically and thermally insulating said electrical conductor; an armor sheath coaxially enclosing said insulating means and said electrical conductor and including a plurality of first and second metal strands helically wound in opposite directions in relation to one another and cooperatively arranged for providing tightly wound concentric inner and outer layers of said metal strands adapted to carry tensile loads applied to said cable; and armor-supporting means coaxially arranged between said armor sheath and said insulating means and adapted for carrying inwardly directed loads imposed by tensioning of said armor sheath, said armor-supporting means including a tubular jacket formed of a helical coil of a rectangularly cross-sectioned metal strip tightly wound around said insulating means and compressively engaged therewith.

2. A suspension cable adapted for supporting a well tool in well bores in which extreme temperatures may be encountered and comprising: a plurality of electrical conductors; insulating means enclosing said electrical conductors and cooperatively arranged for electrically and thermally insulating said electrical conductors and including an elastomeric tubular sheath of poly-m-carboranesiloxane polymer coaxially disposed around each of said electrical conductors, said sheathed conductors being symmetrically grouped together and engaged with one another; an armor sheath coaxially enclosing said insulating means and said electrical conductors and including a plurality of first and second metal strands helically wound in opposite directions in relation to one another around said tubular jacket for providing tightly wound concentric inner and outer layers of said metal strands adapted to carry tensile loads applied to said cable; and armor-supporting means coaxially arranged between said armor sheath and said insulating means and adapted for carrying inwardly directed loads imposed by tensioning of said armor sheath, said armor-supporting means including a tubular jacket formed of a helical coil of a rectangularly cross-sectioned metal strip tightly wound around said symmetrically grouped sheathed conductors and compressively engaged therewith.

3. The cable of claim 2 wherein said symmetrically grouped sheathed conductors are twisted in a spiraling pattern about the longitudinal axis of said cable for accommodation of elongation of said cable.

* * * * *